(12) United States Patent
Park

(10) Patent No.: US 9,876,368 B2
(45) Date of Patent: Jan. 23, 2018

(54) ALTERNATING CURRENT LINKED POWER CONVERTING APPARATUS

(71) Applicant: SOONGSIL UNIVERSITY RESEARCH CONSORTIUM TECHNO-PARK, Seoul (KR)

(72) Inventor: Joung Hu Park, Seoul (KR)

(73) Assignee: SOONGSIL UNIVERSITY RESEARCH CONSORTIUM TECHNO-PARK, Seoul (KR)

( * ) Notice: Subject to any disclaimer, the term of this patent is extended or adjusted under 35 U.S.C. 154(b) by 253 days.

(21) Appl. No.: 14/784,583

(22) PCT Filed: Apr. 15, 2014

(86) PCT No.: PCT/KR2014/003273
§ 371 (c)(1),
(2) Date: Dec. 18, 2015

(87) PCT Pub. No.: WO2014/171719
PCT Pub. Date: Oct. 23, 2014

(65) Prior Publication Data
US 2016/0111899 A1    Apr. 21, 2016

(30) Foreign Application Priority Data

Apr. 15, 2013  (KR) .................. 10-2013-0041191

(51) Int. Cl.
*H02J 7/00* (2006.01)
*H01M 10/44* (2006.01)
(Continued)

(52) U.S. Cl.
CPC ......... *H02J 7/0014* (2013.01); *H01M 10/441* (2013.01); *H01M 10/46* (2013.01);
(Continued)

(58) Field of Classification Search
CPC ..................................................... H02J 7/0014
(Continued)

(56) References Cited

U.S. PATENT DOCUMENTS

| 6,538,414 | B1 | 3/2003 | Tsuruga et al. |
| 8,981,722 | B2 * | 3/2015 | Miura ............... B60L 11/1866 320/118 |

(Continued)

FOREIGN PATENT DOCUMENTS

| JP | 2002-010510 A | 1/2002 |
| JP | 2013-005677 A | 1/2013 |

(Continued)

OTHER PUBLICATIONS

International Search Report for PCT/KR2014/003273 dated Aug. 27, 2014 from Korean Intellectual Property Office.

*Primary Examiner* — M'Baye Diao
(74) *Attorney, Agent, or Firm* — Revolution IP, PLLC

(57) ABSTRACT

Disclosed herein is an alternating current linked power converting apparatus, including: a direct current power unit including a plurality of cells, which provide a direct current (DC) voltage and are connected in series, wherein the direct current power unit has both ends connected to an inverter which converts the direct current voltage to an alternating current (AC) voltage; a cell balancing charger/discharger connected to the plurality of cells and balancing the direct current voltage or an amount of charging between the plurality of cells; and a ripple removing capacitor that is positioned between the cell balancing charger/discharger and the inverter and that includes a first terminal and a second terminal that are respectively connected to a first output terminal and a second output terminal of the cell balancing charger/discharger so as to remove ripples of the direct current voltage.

4 Claims, 3 Drawing Sheets

(51) Int. Cl.
*H01M 10/46* (2006.01)
*H02M 1/14* (2006.01)
*H02M 7/44* (2006.01)
*H01M 16/00* (2006.01)
*H02M 1/15* (2006.01)
*H02M 3/335* (2006.01)
*H01M 10/42* (2006.01)

(52) U.S. Cl.
CPC ........... *H01M 16/00* (2013.01); *H02J 7/0019* (2013.01); *H02M 1/14* (2013.01); *H02M 7/44* (2013.01); *H01M 2010/4271* (2013.01); *H02M 1/15* (2013.01); *H02M 3/33561* (2013.01); *H02M 3/33569* (2013.01)

(58) Field of Classification Search
USPC ........................................................ 320/118
See application file for complete search history.

(56) References Cited

U.S. PATENT DOCUMENTS

| | | | |
|---|---|---|---|
| 9,136,730 | B2 * | 9/2015 | Choi .......................... H02J 7/35 |
| 2009/0029211 | A1 * | 1/2009 | Dong .................... H01M 8/249 |
| | | | 429/431 |
| 2011/0140527 | A1 * | 6/2011 | Choi .......................... H02J 7/35 |
| | | | 307/76 |
| 2013/0093241 | A1 | 4/2013 | Lewis |

FOREIGN PATENT DOCUMENTS

| | | |
|---|---|---|
| KR | 10-2011-0132977 A | 12/2011 |
| KR | 10-2012-0110070 A | 10/2012 |
| WO | 2011-135657 A1 | 11/2011 |

* cited by examiner

[FIG. 1]
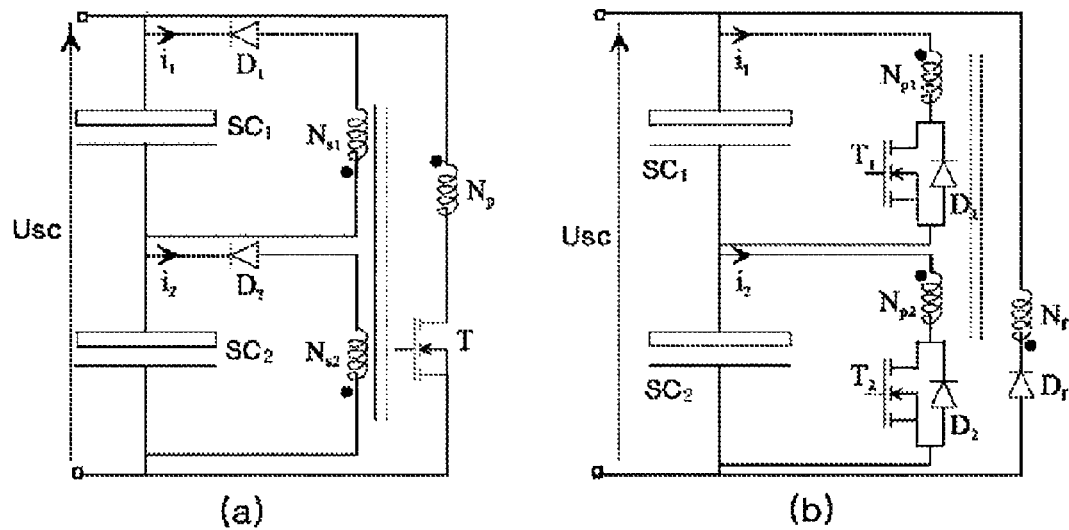
(a)  (b)
[FIG. 2]
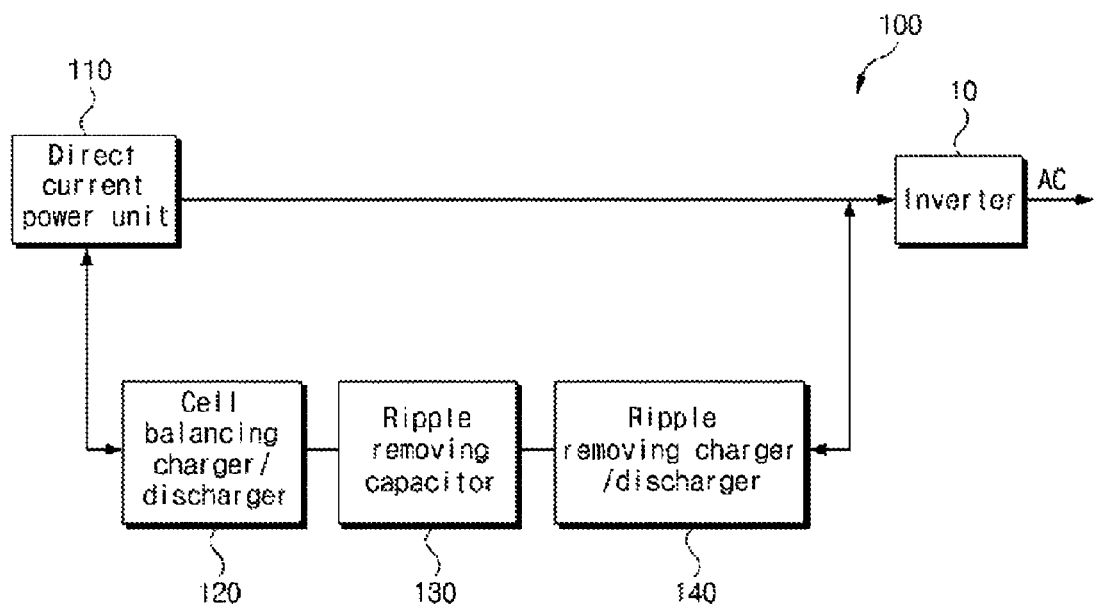

[FIG. 3]
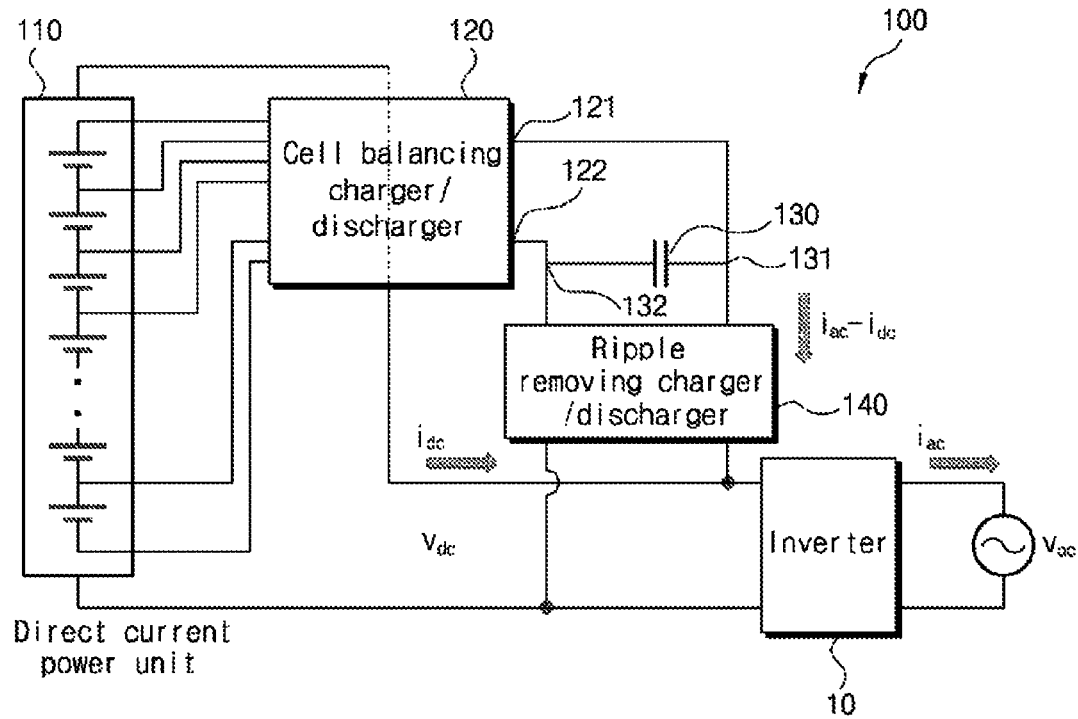
[FIG. 4]
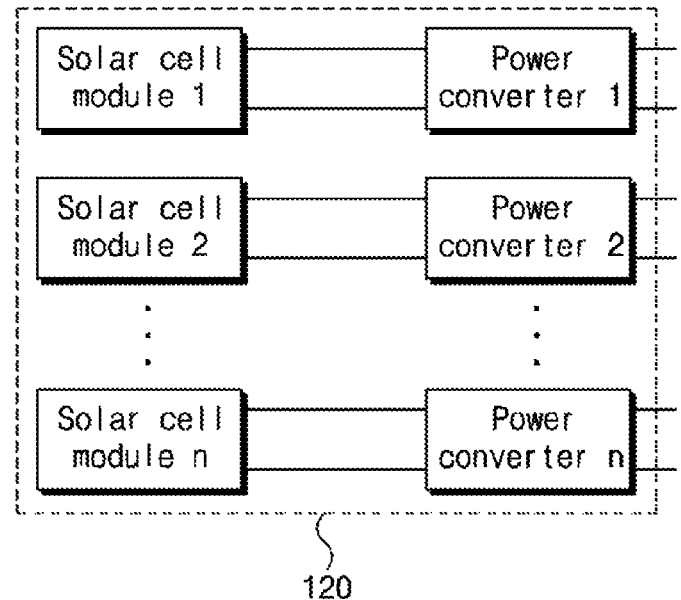

[FIG. 5]
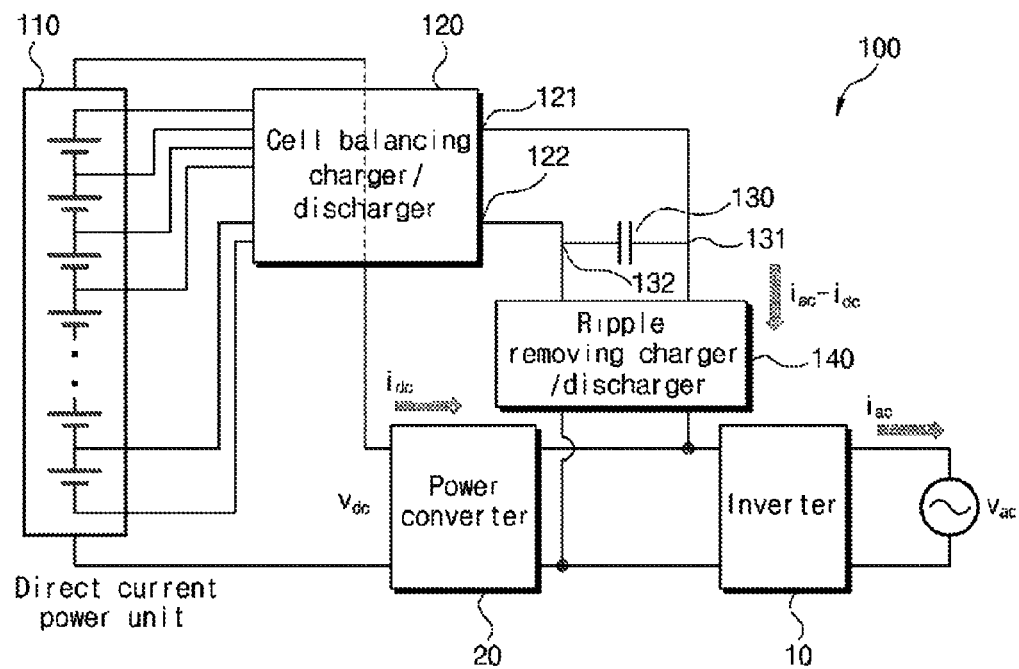
[FIG. 6]
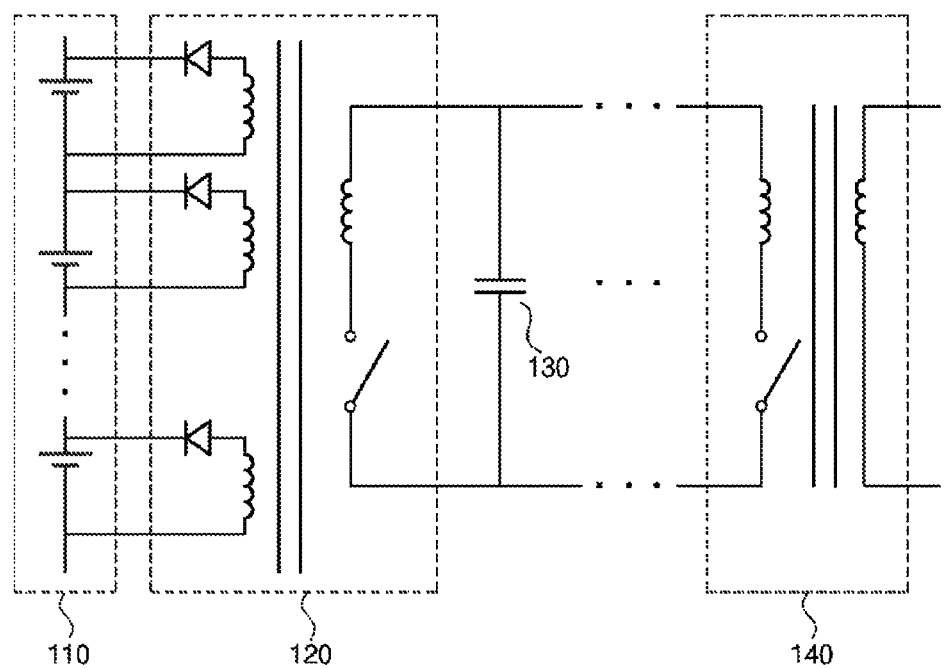

ALTERNATING CURRENT LINKED POWER CONVERTING APPARATUS

CROSS REFERENCE TO PRIOR APPLICATIONS

This application is a National Stage application of PCT International Patent Application No. PCT/KR2014/003273 filed on Apr. 15, 2014, under 35 U.S.C. § 371, which claims priority to Korean Patent Application No. 10-2013-0041191 filed on Jan. Apr. 15, 2013, which are all hereby incorporated by reference in their entirety.

TECHNICAL FIELD

The present invention relates to an alternating current (AC) linked power converting apparatus. More particularly, the present invention relates to an alternating current linked power converting apparatus that may reduce costs for converting power and increase efficiency and reliability thereof.

BACKGROUND ART

A renewable energy source as well as a solar cell does not use fossil fuels which are limited to exist in the Earth, and they have attracted attention as an alternative energy of today in that they minimize environmental pollution. However, since voltage and current of the renewable energy source are unstable, it is not easy to stably supply power to a load. Therefore, a technology that stabilizes the power outputted from a system is being developed by using an energy storage device such as a battery.

A renewable power generation system in the related art has a structure that supplies a required power to a load by sequentially connecting a plurality of power converters from a plurality of power sources. Due to a capacity difference between respective cells between stacks of solar cell modules that correspond to battery stacks (a pack of cells connected in series) inserted in the respective connected portions thereof or a battery (a chemical battery), deviation of charging amount of the batteries may occur. In order to prevent the deviation of the charging amount between the batteries, a charging balance circuit (balancing circuit) is used separately from the power converter.

FIG. 1 illustrates a cell balancing circuit of the related art. Diagram (a) of FIG. 1 is a schematic circuit for charging, and diagram (b) of FIG. 1 is a schematic circuit for discharging. In the related art, the cell balancing circuit having the configuration as shown in FIG. 1 and a charging/discharge circuit for ripple removing (circuit for removing ripples occurring due to alternating current (AC) at a direct current (DC) terminal) are present separately, thus costs and volume of the product may increase, and efficiency and reliability thereof may deteriorate.

Further, in the related art, a high capacity electrolytic capacitor is used for removing ripples of direct current voltage at a DC link. However, the electrolytic capacitor is high-capacity, while its life is short.

The background art of the present invention is disclosed in the Korean Patent Laid-Open Publication No. 2011-0132977 (laid-open on Dec. 9, 2011).

The above information disclosed in this Background section is only to enhance the understanding of the background of the invention and therefore it may contain information that does not form the prior art that is already known in this country to a person of ordinary skill in the art.

DISCLOSURE

Technical Problem

The present invention has been made in an effort to provide an alternating current linked power converting apparatus that may implement a charging/discharge balance with respect to each cell of a plurality of serially connected cells included in a direct current power unit and in which a ripple removing circuit for removing the ripples without the electrolytic capacitor is integrated.

Technical Solution

An exemplary embodiment of the present invention provides an alternating current linked power converting apparatus, including: a direct current power unit including a plurality of cells, which provide a direct current (DC) voltage and are connected in series, wherein the direct current power unit has both ends connected to an inverter which converts the direct current voltage to an alternating current (AC) voltage; a cell balancing charger/discharger connected to the plurality of cells and balancing the direct current voltage or an amount of charging between the plurality of cells; and a ripple removing capacitor that is positioned between the cell balancing charger/discharger and the inverter and that includes a first terminal and a second terminal that are respectively connected to a first output terminal and a second output terminal of the cell balancing charger/discharger so as to remove ripples of the direct current voltage.

The cell balancing charger/discharger may bidirectionally perform charging and discharging operations with respect to the direct current power unit.

One or more power converters may be sequentially connected between the direct current power unit and the inverter, and the ripple removing capacitor may be connected between the cell balancing charger/discharger and an output terminal of one of the one or more power converters.

The alternating current linked power converting apparatus may further include a ripple removing charger/discharger connected between the ripple removing capacitor and a direct current input terminal of the inverter.

The cell balancing charger/discharger may unidirectionally perform the charging or discharging operation with respect to the direct current power unit, and the ripple removing charger/discharger may unidirectionally perform the discharging or charging operation with respect to the direct current power unit.

One or more power converters may be sequentially connected between the direct current power unit and the inverter, and the ripple removing charger/discharger may be connected between the ripple removing capacitor and an output terminal of one of the one or more power converters.

Advantageous Effects

According to embodiments of the present invention, it is possible to implement a charging/discharging balance and eliminate ripples without an electrolytic capacitor with respect to each cell of a plurality of serially connected cells included in a direct current power unit by integrating a cell balancing charger/discharger and a ripple removing capacitor.

DESCRIPTION OF DRAWINGS

FIG. 1 illustrates a cell balancing circuit of the related art.

FIG. 2 illustrates a schematic diagram of an alternating current linked power converting apparatus according to an exemplary embodiment of the present invention.

FIG. 3 illustrates a detailed schematic diagram of FIG. 2.

FIG. 4 illustrates a schematic diagram of another example of a direct current power unit of FIG. 3.

FIG. 5 illustrates a schematic diagram in which a power converter is added to FIG. 3.

FIG. 6 illustrates a schematic circuit diagram of a cell balancing charger/discharger and a ripple removing charger/discharger of FIG. 3.

BEST MODE

The present invention will be described more fully hereinafter with reference to the accompanying drawings, in which exemplary embodiments of the invention are shown.

FIG. 2 illustrates a schematic diagram of an alternating current linked power converting apparatus according to an exemplary embodiment of the present invention. FIG. 3 illustrates a detailed schematic diagram of FIG. 2. The term "alternating current linked" has meanings that include an alternating current output, a system-linked renewable energy distribution generating source, or the like for controlling a motor.

Referring to FIGS. 2 and 3, an alternating current linked power converting apparatus 100 according to an exemplary embodiment of the present invention includes: a direct current power unit 110, a cell balancing charger/discharger 120, a ripple removing capacitor 130, and a ripple removing charger/discharger 140.

The direct current power unit 110 includes a plurality of cells providing a direct current voltage. The plurality of cells are connected in series to provide a high voltage. Opposite ends of the direct current power unit 110 are respectively to an inverter 10, and the inverter 10 converts a direct current voltage to an alternating current voltage.

The direct current power unit 110 may correspond to a battery, an LED, a solar cell, a fuel cell, etc., and the direct current power unit 110 may be connected to a renewable energy source including a wind power or solar cell.

The cell balancing charger/discharger 120 is connected to each of the plurality of cells to balance a direct current voltage and an amount of charging between the plurality of cells. The cell balancing charger/discharger 120 solves a different charging/discharging state per each cell (module), and minimizes the deviation between the cells.

A first terminal 131 and a second terminal 132 of the ripple removing capacitor 130 are respectively connected to a first output terminal 121 and a second output terminal 122 of the cell balancing charger/discharger 120 so as to remove and smooth the ripples of the direct current voltage. Unlike a conventional high-capacity electrolytic capacitor with a short life, the ripple removing capacitor 130 is used as a low-capacity capacitor with a long life, thereby reducing costs and extending a life.

Herein, the cell balancing charger/discharger 120 may simultaneously and bidirectionally performs charging and discharging with respect to the direct current power unit 110, or may unidirectionally perform one of the charging and the discharging with respect to the direct current power unit 110.

When the cell balancing charger/discharger 120 performs the bidirectional operations, it is not matter with or without the ripple removing charger/discharger 140. In the absence of the ripple removing charger/discharger 140, the ripple removing capacitor 130 is connected to the inverter 10 through the cell balancing charger/discharger 120. In this case, the cells are positioned an input terminal of the inverter 10.

As described above, when the cell balancing charger/discharger 120 can bidirectionally perform the charging and the discharging, although the ripple removing charger/discharger 140 is unnecessary, while when one of the charging and the discharging is unidirectionally performed, the ripple removing charger/discharger 140 is separately required.

In this case, the ripple removing charger/discharger 140 is connected between the ripple removing capacitor 130 and a direct current inputting terminal of the inverter 10, and performs charging or discharging with respect to the direct current power unit 110. For example, when the cell balancing charger/discharger performs the charging, the ripple removing charger/discharger may perform the discharging, and the vice versa. By applying such a bidirectional charging/discharging circuit, a bidirectional operation as an exceptional case (ex, the time of an accident) may be performed.

As described above, according to the exemplary embodiment of the present invention, it is possible to balance the charging and the discharging with respect to the respective cells and to remove ripples without a conventional high-capacity electrolytic capacitor by connecting the cell balancing charger/discharger 120 and the ripple removing capacitor 130 to the plurality of cells connected in series that are included in the direct current power unit 110.

Further, according to the present exemplary embodiment, a charger/discharger with a cell-charging balancing function is connected to each cell of the direct current power unit 110 and a ripple-removing function and a cell balancing function may be integrated, thereby reducing costs, size and volume, and improving power converting efficiency and reliability.

As such, as shown in FIG. 3, when it is required to remove voltage ripples occurring in the direct current power unit 110 and the ripple removing charger/discharger 140 is used as a bidirectional charger/discharger, the cell balancing charger/discharger 120 and the ripple removing charger/discharger 140 may be integrated into one.

Alternatively, although the plurality of cells of the direct current power unit 110 are connected in series as shown in FIG. 2, a plurality of solar cell modules and power converters (or power adjusters) instead of the plurality of cells may be connected as shown in FIG. 4. FIG. 4 illustrates a schematic diagram of another example of a direct current power unit of FIG. 3. As shown in FIG. 4, the direct current power unit 110 may include n solar cell modules and n power converters respectively connected to the solar cell modules. Rear terminals of the respective power converters connected to the respective solar cell modules are respectively connected to front terminals of the cell balancing charger/discharger 120.

In the present exemplary embodiment, a current (or voltage) feedback controller that can simultaneously perform ripple-removing and charging/discharging current control may be included in the charger/discharger, and the current control of the charger/discharger for removing the ripples may be performed by setting a reference current to $(i_{ac} - i_{dc})$. A controller configured in a negative feedback may be implemented in a linear element or a non-linear element, and a typical controller-designing method may be applied thereto.

FIG. 5 illustrates a schematic diagram in which a power converter is added to FIG. 3. One or more power converters 20 may be cascaded between the direct current power unit 110 and the inverter 10. The power converters are used when it is required to change the magnitude of the direct current voltage.

When the cell balancing charger/discharger 120 unidirectionally operates, the ripple removing charger/discharger 140 is necessary, accordingly, in this case, the ripple removing charger/discharger 140 is directly connected between the ripple removing capacitor 130 and an output terminal of one of the one or more power converters 20 at which a cell is positioned.

When the cell balancing charger/discharger 120 bidirectionally operates, the ripple removing charger/discharger 140 is unnecessary, accordingly, in this case, the ripple removing capacitor 130 is directly connected between the cell balancing charger/discharger 120 and an output terminal of one of the one or more power converters 20. The ripple removing capacitor 130 may also be connected to only target portion for removing ripples.

FIG. 6 illustrates a schematic circuit diagram of a cell balancing charger/discharger and a ripple removing charger/discharger of FIG. 3. In FIG. 6, the cell balancing charger/discharger 120 and the ripple removing charger/discharger 140 correspond to those which are known in the related art, and since they correspond to a charger/discharger, they may be similarly configured each other. However, the cell balancing charger/discharger 120 and the ripple removing charger/discharger 140 are not limited thereto, and various known circuits may be applied.

As described above, according to the exemplary embodiments of the present invention, it is possible to implement the charging and discharging balance of each cell, to remove the ripples without the electrolytic capacitor, and to use the ripple removing charger/discharger connected to the ripple removing capacitor together with the balancing circuit, by connecting the cell balancing charger/discharger and the ripple removing capacitor to the plurality of cells of the direct current power unit.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

The invention claimed is:

1. An alternating current linked power converting apparatus, comprising:
   a direct current power unit including a plurality of cells, which provide a direct current (DC) voltage and are connected in series, wherein the direct current power unit is connected to an inverter which converts the direct current voltage to an alternating current (AC) voltage;
   a cell balancing charger/discharger connected to the plurality of cells and balancing the direct current voltage or an amount of charging between the plurality of cells;
   a ripple removing capacitor that is positioned between the cell balancing charger/discharger and the inverter and that includes a first terminal and a second terminal that are respectively connected to a first output terminal and a second output terminal of the cell balancing charger/discharger so as to remove ripples of the direct current voltage; and
   a ripple removing charger/discharger connected between the ripple removing capacitor and a direct current input terminal of the inverter.

2. The alternating current linked power converting apparatus of claim 1, wherein
   the cell balancing charger/discharger unidirectionally performs the charging or discharging operation with respect to the direct current power unit, and
   the ripple removing charger/discharger unidirectionally performs the discharging or charging operation with respect to the direct current power unit.

3. The alternating current linked power converting apparatus of claim 1, wherein
   one or more power converters are sequentially connected between the direct current power unit and the inverter, and
   the ripple removing charger/discharger is connected between the ripple removing capacitor and an output terminal of one of the one or more power converters.

4. The alternating current linked power converting apparatus of claim 2, wherein
   one or more power converters are sequentially connected between the direct current power unit and the inverter, and
   the ripple removing charger/discharger is connected between the ripple removing capacitor and an output terminal of one of the one or more power converters.

\* \* \* \* \*